United States Patent Office 2,977,296
Patented Mar. 28, 1961

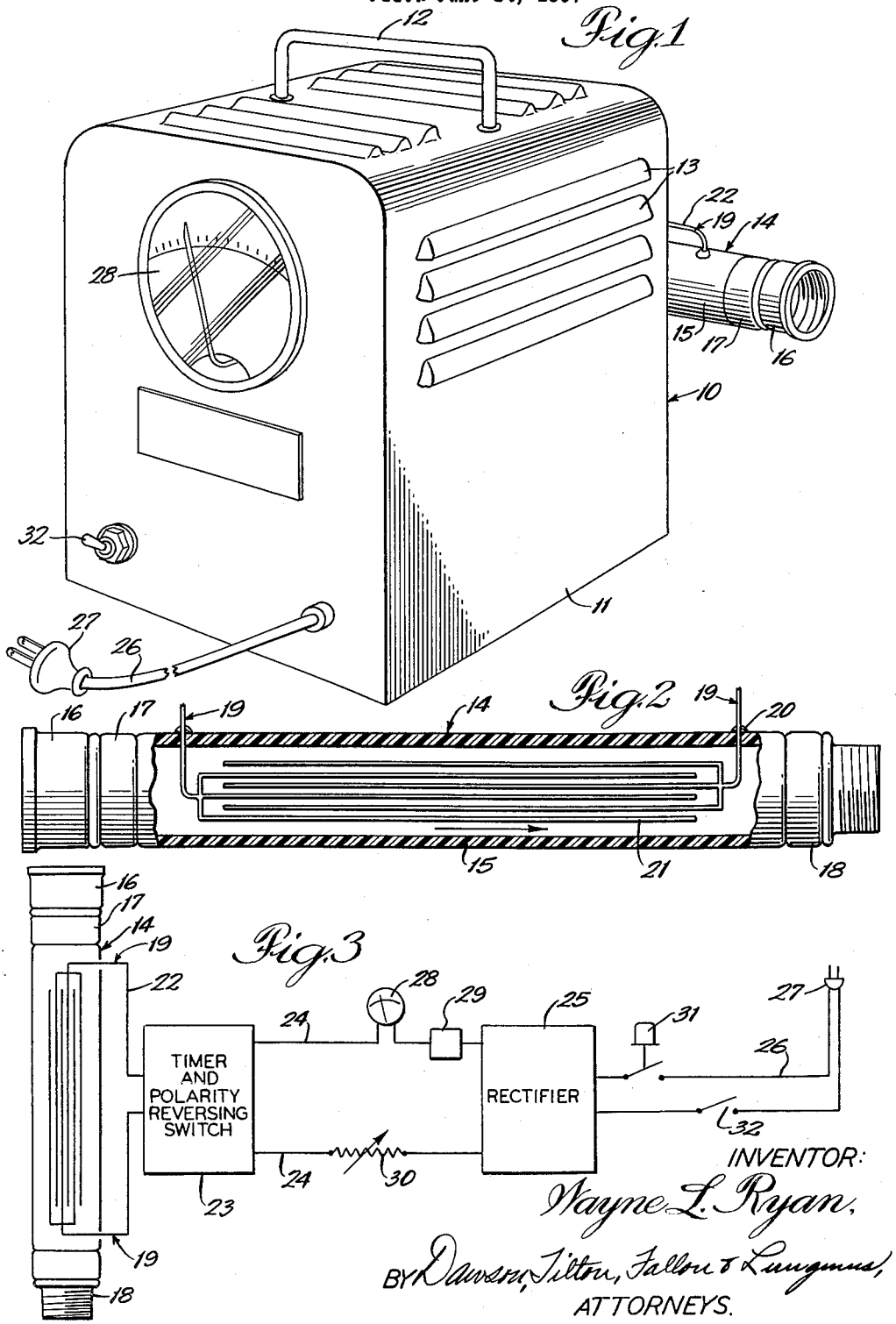

2,977,296

PRESERVATION OF CUT FLOWERS

Wayne L. Ryan, 3084 S. 40th St., Omaha, Nebr.

Filed June 14, 1957, Ser. No. 665,817

3 Claims. (Cl. 204—149)

This invention relates to an improvement in the preservation of cut flowers, and more particularly to a machine providing a cut flower preservative solution.

Two primary problems exist in providing floral displays, as of cut flowers. One problem relates to the appearance of the flower, which, it is to be appreciated, is of utmost importance since that factor is prominent in the enjoyment to be derived by the person using the flowers. The other problem relates to the life of the flower, since, in most cases, it is desired to prolong the enjoyment of the flower as long as possible. These two problems can be considered to be interrelated, since the deterioration in appearance of a flower is usually the sign of the end of its useful life. Cut flowers that ordinarily would be expected to have a useful life of a week or more, may deteriorate to such an extent that they can only be used for a few days. Many times this deterioration is produced by the flowers being attacked by microorganisms. Often accused in this respect are certain fungi. Yet other mechanisms of deterioration take place which are as yet imperfectly understood. It is, therefore, apparent that any means which would prolong the effective life, that is, the span during which the cut flower retains its original bloom, is desirable.

The need for preserving cut flowers as in their original condition of bloom, begins right after they are cut. It is not unusual for such popular flowers as roses to present the disconcerting problem of bluing during handling prior to sale to the ultimate consumer. In other instances, flowers are attempted to be preserved prior to sale by dry packaging, as in flexible plastic containers having airtight seals. This expedient again has proven inadequate, since microorganism attack may occur even within the air-tight container.

The over-all storage of cut flowers, both during the period prior to sale and by the ultimate consumer, has been approached in many ways so as to preserve the original bloom of the cut flowers. To my knowledge, however, all of the expedients employed for such preservation involve considerable work. Even the simplest expedients which consist of fortified aqueous solutions in which the stems of the cut flowers are immersed, require an operation which can be onerous. It is, therefore, apparent that it would be exceedingly desirable if all this could be done effortlessly and simultaneously with the filling of the vase or other container for the flowers.

An object of this invention is to provide an improvement in the preservation of cut flowers. Another object is to provide a machine adapted to dispense a preservative fluid for cut flowers. Still another object is to provide a machine adapted to dispense a cut flower preservative solution, the machine being adapted to be connected to a water tap. Yet another object is to provide a machine for dispensing a preservative solution for cut flowers in which electrode means are provided for the introduction into the solution of silver ions. A further object is to provide a machine of the character specified in the object immediately preceding, in which zinc ions are additionally introduced into the preservative solution.

A still further object of this invention is to provide a method for the preservation of cut flowers which employs a novel preservative composition including both silver and zinc ions. Other objects and advantages of this invention can be seen as this specification proceeds.

This invention is based in part upon my discovery that there appears to be a synergistic effect between the metals of silver and zinc when introduced into a flower preservative solution. Although the mechanism of the operation of this invention is imperfectly understood, it is believed that the unexpected cooperation of these two metals in prolonging the effective life of cut flowers is attributable to an inhibition of an enzyme system in the flowers.

This invention will be further described in conjunction with the accompanying drawing, in which—

Figure 1 is a perspective view of a machine embodying teachings of this invention; Fig. 2 is an enlarged elevational view, partly in section, of the conduit portion of the machine or device shown in Fig. 1; and Fig. 3 is a schematic view of the electrical circuit provided in the machine shown in Fig. 1 and interconnected with the conduit shown in Fig. 2, the conduit of Fig. 2 being shown in reduced form in the extreme left-hand portion of the view seen in Fig. 3.

Referring now to the drawing, the numeral 10 designates generally a machine or device for providing a cut flower preservative solution embodying teachings of this invention. Device 10 includes a housing 11, which can conveniently be constructed of metal or plastic and which has generally a cubical structure. One face of housing 11 is provided with a handle 12 to permit convenient transport of device 10 from place to place. Louvers 13 are provided in some of the faces of housing 11 to provide ventilation for the internal operative portions to be described hereinafter.

Associated with housing 11, as by mounting on one face thereof, is a conduit designated generally by the numeral 14. Only a portion of conduit 14 is seen in Fig. 1, the conduit being seen in enlarged and full form in Fig. 2. Not shown, but provided on housing 11, are suitable mounting means for conduit 14. Such mounting means may conveniently take the form of clamps, bands, straps, or the like, all of which will be apparent to those skilled in the art, the details of which are considered unnecessary for understanding of this invention.

In the illustration given in Fig. 2, conduit 14 includes a length of tubing 15, which conveniently may be constructed of plastic. Alternatively, a metal pipe can be employed. One end of tubing 15 is provided with a female fitting 16 suitably coupled to tubing 15 by a clamping ring 17. The opposite end of tubing 15 is provided with a male fitting 18, also suitably coupled to tubing 15. It is to be appreciated that the fittings set forth herein are merely for the purpose of illustration, and other types of fittings can be conveniently employed as the usage dictates. In certain instances, however, it is expected that female fitting 16 can be connected to the outlet of a water faucet or tap, and the male fitting 18 can be connected to a length of hose which will permit delivery of water from a water tap (not shown) to a remote point for the purpose of filling containers or vases for cut flowers.

Provided in tubing 15 are electrodes 19. Electrodes 19 extend through the wall defining tubing 15 and are secured against lateral movement by plugs 20 which circumscribe electrodes 19 and are attached to the outer wall surface of tubing 15. Where tubing 15 is constructed of metal, plugs 20 can be extended through openings in the wall of such metal tubing to insulate electrodes 19 from the metal tubing. Where, however, tubing 15 is constructed of a relatively poor conductor such as plastic, it is unnecessary to provide additional insulating means in the form of extending plugs 20 through the wall of tubing 15.

Electrodes 19 are provided at their ends inward of tubing 15 with a plurality of plates 21 which, in the illustration given, are interleaved to provide maximum area of electrical current flow. Optimum results are achieved when electrodes 19 are each constructed of approximately 90% silver and 10% zinc. Satisfactory results are also obtainable when silver electrodes are employed.

The circuit shown in Fig. 3 can be conveniently employed for delivering electrical current to electrodes 19 for the purpose of ionizing the metal provided therein to achieve a novel cut flower preservative solution. In Fig. 3, the numeral 14 again designates generally a conduit adapted to be connected to a source of water such as a faucet. The electrodes 19 provided therein are connected by suitable wiring 22 to a timer and polarity reversing switch, shown schematically and designated by the numeral 23. Switch 23 is electrically coupled by means of wiring 24 to rectifier 25, which in turn is provided with an electrical connection 26 terminating in a male plug 27 adapted to be inserted in a wall outlet, or the like.

For the sake of illustration, plug 27 is connected into a conventional outlet which provides 110 volt alternating current. When such voltage is imposed across the inlet connections of rectifier 25, an output of about 6–7 volts direct current is provided to flow in electrical connection 24, the value of current flow being indicated on ammeter 28. Also provided in wiring connection 24 is a circuit breaker 29, which protects the remainder of the circuit from overload. Ammeter 28 indicates current flow which is proportional to the rate of solubilization of ions from electrodes 19. Ammeter 28 also indicates failure of the cell as either by electrical shorts or an open circuit. Also provided in electrical connection 24 is a variable resistance 30 which can be conveniently employed to regulate the current flow of metal solubilization. Inserted in electrical connection 26 is pressure switch 31, which can be inserted in the water stream and is used to actuate the electrolytic cell provided by electrodes 19 whenever water flow occurs. Single pole switch 32 is also provided in the A.C. supply circuit which may take the form of toggle switch 32, seen on the front panel of housing 11.

I find it preferable to use the electrode arrangement shown, since the desired metal concentration (approximately 5–100 parts per million of metal ions) can be conveniently obtained at conventional water flow rates. Providing polarity reversing switch 23 substantially eliminates fouling of the plates with metal salts, along with using metal from the two electrodes equally. With device 10, it is possible for the florist to obtain a supply of flower preservative simply by turning on a water faucet.

Device 10 may also be used in related applications requiring solutions in the nature of preservatives such as are useful in the inhibition of bacterial or virus growth. An example of such a use would be a home swimming pool.

It is believed that this invention can be further appreciated by considering samples of its use.

EXAMPLE I

Two sets of substantial identical Better Times Roses, each set containing 8 flowers, were provided. These flowers were placed in vases containing water and maintained at 5° C., which approximates the temperature of the cold room or refrigerator of a florist. One vase contained water taken directly from a tap, while the other vase contained water taken from the same tap but passed through machine 10. Storage results are shown in Table I below.

Table I

| Days at 5° C. | Flower Days When Held in Water | Flower Days When Held in Silver Zinc |
| --- | --- | --- |
| 0 | 8 | 8 |
| 4 | 4 | 8 |
| 7 | 3 | 7 |
| 15 | (1) | 6 |

[1] 75–80% failed to open, rest lasted one day.

The foregoing table shows only a slight loss in flower life if the silver-zinc mixture is used to store the flowers, as contrasted to plain tap water. The importance of the extension of storage life becomes meaningful when it is appreciated that retail florists now generally feel that blooms cannot be marketed that are held more than 6–7 days past cutting. With the machine and solution described above, I have found that storage of flowers for two or more weeks is possible.

More marked effects on prolonging the life of flowers through the use of a silver-zinc solution can be seen from a consideration of Example II below.

EXAMPLE II

Five bouquets of carnations of substantially identical make-up were provided and were stored in suitable containers at room temperature. One bouquet had its stems immersed in plain tap water, which acted as a control. Another was immersed in a 0.01% solution of zinc acetate. Yet another was contacted with a water solution of 0.001% zinc acetate. Yet another was contacted with an aqueous solution of 0.001% silver acetate. The fifth bouquet had its stems immersed in an aqueous solution containing 0.001% silver acetate and 0.001% zinc acetate. Results of the storage of the above described five bouquets is shown in Table II below:

Table II

| Solution | Flower Days |
| --- | --- |
| Control—tap water | 7 |
| Zinc acetate, 0.01% | 10 |
| Zinc acetate, 0.001% | 9 |
| Silver acetate, 0.001% | 10 |
| Silver acetate, 0.001% plus zinc acetate, 0.001% | 15 |

Similar marked improvements in the life of stored flowers have been noted in the case of gladioli and snapdragons.

For maximum cut flower life, a small quantity of a nutrient such as sucrose can also be conveniently added to the preservative solutions described above. I have found that solutions employing from about 5 to 100 parts per million of silver and zinc ions (approximately 90% of which is silver) can be successfully employed in the prevention of bluing of roses. Superior results in preventing bluing can be achieved by dipping the entire rose for a period of at least about 3 minutes in a solution of silver and zinc ions.

In the event that dry packaging of cut flowers is employed to preserve them prior to sale, mold or fungus growth can be avoided thereon through the use of a silver-zinc solution. Ordinarily, flowers in a dry packaged state and when stored at 35° F. will last for about 3–4 weeks. However, the preservation for this period is unsatisfactory in many instances since mold or fungus growth often mars the appearance of the flowers. I have found that known fungicides are inadequate for preventing this disfigurement, since in preventing the growth of microorganisms they often cause spotting on the blooms. This problem can be solved through the use of a coating employing silver and zinc ions in a concentration of about 5–100 parts per million, to which is also added a cellulosic wetting agent such as methyl cellulose or carboxy cellulose to give a final concentration of about 0.1%. The cellulosic wetting agents provide a smooth adherent film of silver and zinc ions on the flower and subsequently permit the bloom to be wetted.

Satisfactory results can be obtained in employing ion concentrations in the range of 1–500 parts per million. Concentrations below about 1 part per million of ions have been found not to produce the desired results. Concentrations of ions above about 500 parts per million have been found undesirable since in such cases the silver tends to flocculate and thus interfere with the transpiration of the flower. Although satisfactory results are obtained using an ion concentration in the range of 100–500 parts per million, the cost of the silver employed becomes a factor and may make such concentrations unattractive.

While, in the foregoing specification, I have set forth in considerable detail specific structure and steps for the purpose of illustrating the invention, it will be understood that such details may be varied widely by those skilled in the art without departing from the spirit of my invention.

I claim:

1. In a device for providing a cut flower preservative solution, a housing, a conduit mounted on said housing equipped with an inlet adapted to be connected to a water tap and having an outlet, a pair of electrodes in said conduit, said electrodes each comprising about 90% silver and about 10% zinc, means for applying a direct current to said electrodes, and means in said applying means limiting the current applied to provide a solubilization of said electrodes at a rate of about 1–500 parts per million in water flowing through said conduit.

2. In a device for providing a cut flower preservative solution, a housing, a conduit mounted on said housing equipped with an inlet adapted to be connected to a water tap and having an outlet, a pair of silver-containing electrodes in said conduit, said electrodes also containing about 10% zinc, means coupling said electrodes with polarity-reversing means in said housing, alternating current voltage rectifying means in said housing, means for coupling said voltage rectifying means to a source of alternating current voltage, means for coupling said alternating current voltage rectifying means to said polarity-reversing means, current flow-indicating means in said housing associated with the last-mentioned coupling means, resistance means associated with said last-mentioned coupling means, said resistance means being adjustable to provide solubilization of said electrodes at a rate of about 1–500 parts per million in water flowing through said conduit, and pressure-sensitive means in said conduit electrically connected with the first-mentioned coupling means.

3. In a method of providing a water stream useful for preserving cut flowers, and the like, the steps of directing a stream of water through a pair of electrodes each comprising about 90% silver and 10% zinc while applying direct current voltage between the electrodes and limiting the current to a value resulting in the solubilization of said electrodes at the rate of about 1–500 parts per million in the water flowing therethrough.

References Cited in the file of this patent

UNITED STATES PATENTS

| 943,187 | Hartman | Dec. 14, 1909 |
| 951,312 | Hartman | Mar. 8, 1910 |
| 951,315 | Hartman | Mar. 8, 1910 |
| 2,046,467 | Krause | July 7, 1936 |
| 2,464,512 | Joffe | Mar. 15, 1949 |
| 2,698,809 | Fessenden | Jan. 4, 1955 |

FOREIGN PATENTS

| 349,992 | Great Britain | May 27, 1931 |

OTHER REFERENCES

Shepherd: Scientific Monthly, May 1945, pp. 395–396.
Addicks: "Silver in Industry," 1940, pages 401–402, Reinhold Publishing Co.